United States Patent [19]

Wagner et al.

[11] Patent Number: 5,680,807
[45] Date of Patent: Oct. 28, 1997

[54] VACUUM BRAKE BOOSTER FOR MOTOR VEHICLES

[75] Inventors: Wilfried Wagner, Hüttenberg; Ralf Jakobi, Flörsheim; Kai-Michael Graichen, Langen, all of Germany

[73] Assignee: ITT Automotive Europe GmbH, Frankfurt, Germany

[21] Appl. No.: 553,379

[22] PCT Filed: Oct. 28, 1994

[86] PCT No.: PCT/EP94/03556

§ 371 Date: Nov. 13, 1995

§ 102(e) Date: Nov. 13, 1995

[87] PCT Pub. No.: WO95/15877

PCT Pub. Date: Jun. 15, 1995

[30] Foreign Application Priority Data

Dec. 8, 1993 [DE] Germany .................. 43 41 838.4

[51] Int. Cl.⁶ .................................................. F01B 19/00
[52] U.S. Cl. ............................................. 92/48; 91/533
[58] Field of Search .......................... 92/48; 91/369.2, 91/376 R, 533

[56] References Cited

U.S. PATENT DOCUMENTS

| | | |
|---|---|---|
| 3,146,679 | 9/1964 | Ayers, Jr. . |
| 5,014,597 | 5/1991 | Rueffer et al. . |
| 5,040,450 | 8/1991 | Jakobi . |
| 5,062,348 | 11/1991 | Gotoh et al. . |
| 5,158,004 | 10/1992 | Bauer . |
| 5,214,996 | 6/1993 | Gautier et al. .............. 92/48 |

FOREIGN PATENT DOCUMENTS

| | | |
|---|---|---|
| 2 135 705 | 1/1972 | Germany . |
| 2 918 915 | 12/1980 | Germany . |
| 3 114 917 | 3/1982 | Germany . |
| 3 744 012 | 7/1989 | Germany . |
| 3 904 641 | 8/1990 | Germany . |
| 3 913 536 | 10/1990 | Germany . |
| 4 013 480 | 10/1991 | Germany . |
| 4 021 304 | 1/1992 | Germany . |
| 4-24157 A | 1/1992 | Japan . |
| 2 246 180 | 1/1992 | United Kingdom . |
| 9 311 012 | 6/1993 | WIPO . |

Primary Examiner—Thomas E. Denion
Attorney, Agent, or Firm—Thomas N. Twomey; J. Gordon Lewis

[57] ABSTRACT

To prevent a rolling diaphragm (13), which forms the movable wall (4) of a vacuum brake booster along with a metallic diaphragm disk (12), from becoming detached from an annular groove (52) accommodating a radially inner bead (32) of the rolling diaphragm (13), the rolling diaphragm is connected to the edge of the bead (32) located away from the (first) diaphragm disk (12). By connecting the rolling diaphragm (13) to the edge of the bead (32) located away from the (first) diaphragm disk (12), a pneumatic space (27) is defined by the rolling diaphragm (13) and the (first) diaphragm disk (12). Pressure occurring in the vacuum chamber(s) (28, 30) can be admitted to the pneumatic space (27).

20 Claims, 2 Drawing Sheets

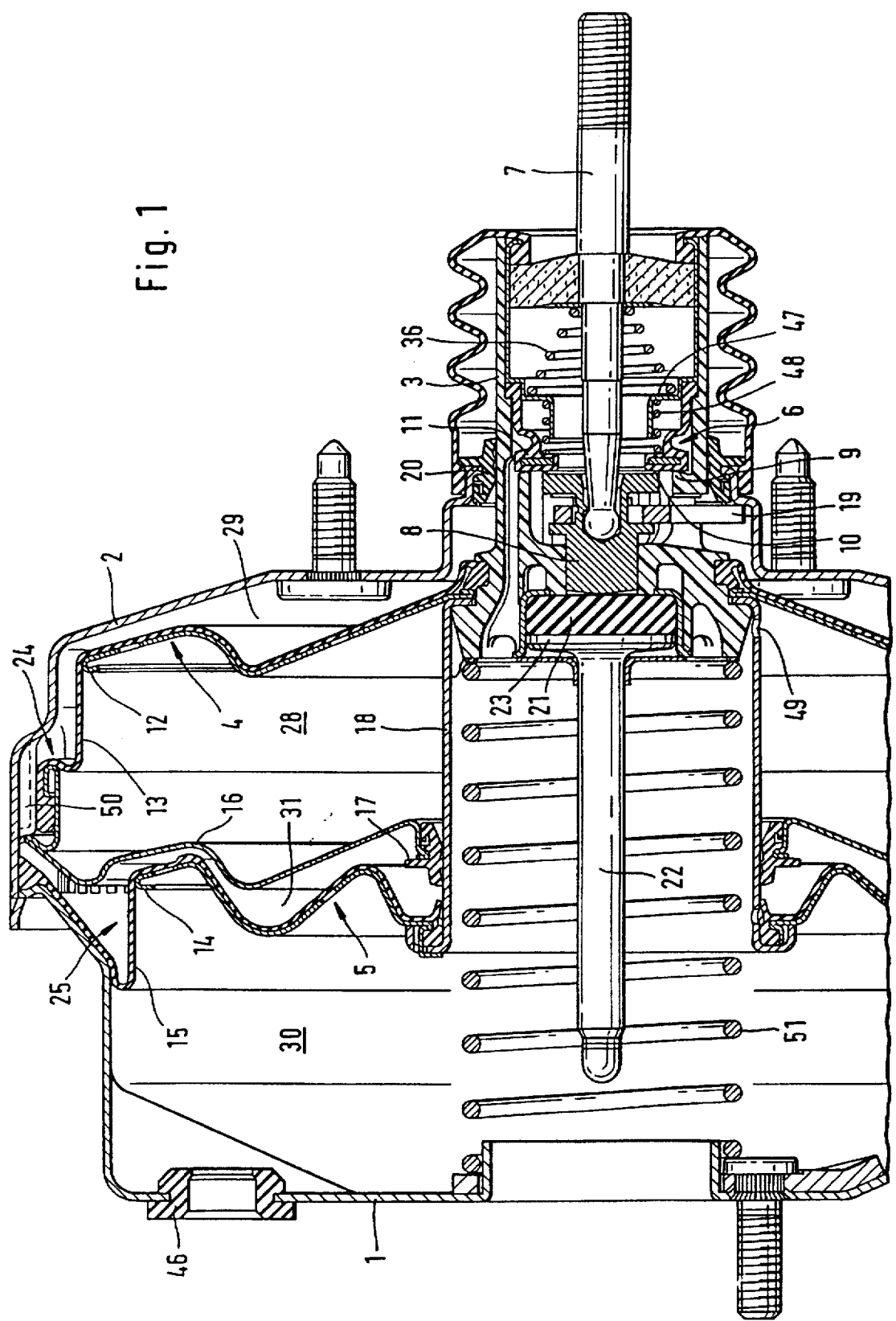

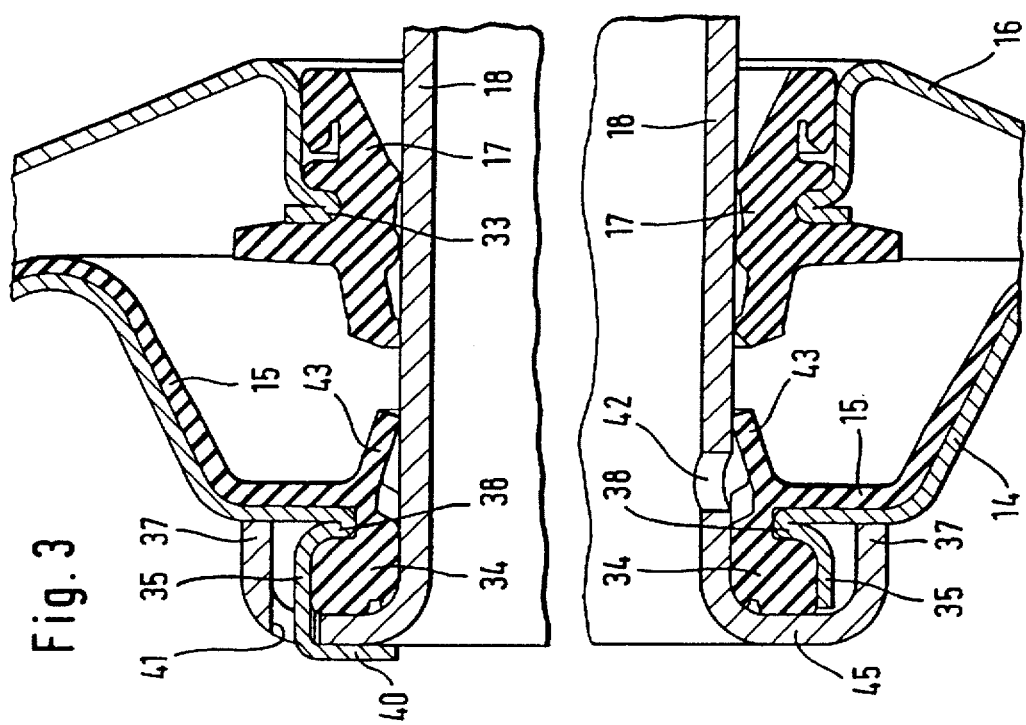

VACUUM BRAKE BOOSTER FOR MOTOR VEHICLES

This application is the U.S. national-phase application of PCT International Application No. PCT/EP94/03556 filed Oct. 28, 1994.

BACKGROUND OF THE INVENTION

The present invention pertains to a vacuum brake booster for motor vehicles, with a first and a second booster space, which are separated from one another by a partition. A first and a second movable wall respectively divide the first booster space into a first vacuum chamber and a first working chamber and the second booster space into a second vacuum chamber and a second working chamber. Each movable wall is formed by a diaphragm disk and a rolling diaphragm in contact with the diaphragm disk. The first movable wall is arranged on a control housing accommodating the control valve, and the second movable wall is arranged on a connection tube extending through the partition. The connection tube is provided with a radial collar axially supported on the control housing. The radially inner edge area of the first diaphragm disk surrounds the control housing, is axially in contact with the collar, and is held by the first rolling diaphragm. The first rolling diaphragm has a bead which is clamped in an annular groove, which is provided in the control housing outside of the area of the control housing which is encompassed by the connection tube and proximate the fastening area of the connection tube and the first diaphragm disk to the control housing.

Such a vacuum brake booster and such a manner of fastening its movable walls to the control housing and to the connection tube are described in German Patent DE-OS 39 04 641. The first rolling diaphragm, which forms part of the first movable wall, is bound to the edge of the annular bead located adjacent to the first diaphragm disk. The bead of the second rolling diaphragm, sealing the second movable wall against the connection tube, is held between the second diaphragm disk supported by a second radial collar of the connection tube and a claw ring pushed over the connection tube. The second diaphragm disk is firmly connected, for example welded, to the collar of the connection tube.

However, such prior art vacuum brake boosters involve the risk that the rolling diaphragms could become detached under certain operating conditions, which considerably impairs the reliability of operation of such brake devices.

This risk occurs especially as a consequence of dynamic pressure in the brake device due to it being actuated without vacuum or with the check valve outlets closed, because force components acting in the radial direction are generated due to the pressure occurring in the brake booster housing. These force components tend to pull the annular bead of the first rolling diaphragm out of the circumferential groove of the control housing or to displace the first diaphragm disk against the actuating pressure, so that the annular bead is pushed out of the groove. This leads to failure of the brake device, whose boosting force cannot be built up any more.

The relatively high manufacturing costs associated with the use of the above-mentioned claw ring, as well as the difficulties occurring during its mounting, are also disadvantageous.

SUMMARY OF THE INVENTION

A vacuum brake booster according to the present invention minimizes the above-described disadvantages, maintains the design and the ratings of the device, and maintains a reliable operation by using the parts already present. In particular, according to the present invention, an additional part for fastening and sealing the second movable wall is not needed, mounting is simple, and a pressure difference which exists between the second vacuum chamber and the second working chamber and acts in the reverse (i.e., "wrong") direction can be eliminated with certainty.

According to the present invention, the first rolling diaphragm is bound to the edge of the bead located away from the first diaphragm disk or from the collar of the connection tube such that with the first diaphragm disk, the first rolling diaphragm defines a pneumatic space to which pressure occurring in the vacuum chambers can be admitted. The excess material of the rolling diaphragm, which is due to the radial widening of the bead, is brought into a position predetermined by this design.

In advantageous variants of the subject of the present invention, the radially inner edge area of the diaphragm disk is designed as a beaded edge, and the radially inner edge area of the partition is provided with a beading, which secures a sealing ring arranged therein against axial displacement. An increase in the stability of the parts is achieved by this measure.

An especially easy-to-mount, effective sealing of the second movable wall against the connection tube is achieved in another advantageous embodiment of the present invention, in which the second rolling diaphragm has a radially inner bead, which cooperates with a radially outwardly extending second collar of the connection tube. A first, axially extending cylindrical annular surface, which radially surrounds the bead of the second rolling diaphragm, is provided in the radially inner edge area of the second diaphragm disk. The first annular surface preferably joins a beading of smaller diameter of the second diaphragm disk, wherein the bead of the second rolling diaphragm is clamped axially between the second collar and the beading of the second diaphragm disk under pretension.

To achieve an effective transmission of force between the second movable wall and the connection tube, according to another advantageous feature of the present invention, the second collar of the connection tube includes an axially extending, second annular surface, which is in contact with the second diaphragm disk.

In another embodiment of the vacuum brake booster according to the present invention, the first annular surface has on its circumference at least two symmetrically arranged bending straps, which extend through recesses provided in the second collar and are axially in contact with the second collar when mounted. This embodiment reliably fixes both the diaphragm disk and the second rolling diaphragm in position.

In another embodiment of the present invention, the pneumatic pressure difference that may develop in the second vacuum chamber can be eliminated especially rapidly. In this embodiment, the connection tube has openings in the area where the second movable wall is fastened to the connection tube, and the second rolling diaphragm is provided with a circumferential sealing lip which is in contact with the connection tube and extends over the openings.

According to another feature of the present invention, the bead of the first rolling diaphragm has an annular surface, which is in contact with the radially inner edge area of the first diaphragm disk, and leads to an increase in the sealing action of the first rolling diaphragm in the area where the first movable wall is fastened to the control housing. In addition, rattling noises are extensively avoided as a result.

Other details and advantages of the vacuum brake booster according to the present invention become apparent from the following description of an exemplary embodiment of the present invention, which will be explained in greater detail on the basis of the drawings, wherein the parts corresponding to each other are provided with the same reference numbers.

BRIEF DESCRIPTION OF THE DRAWINGS

In the drawings,

FIG. 1 shows an axial section through an embodiment of the vacuum brake booster according to the present invention, FIG. 2 shows an enlarged area of FIG. 1 where the first movable wall of the vacuum brake booster is fastened to the control housing, and FIG. 3 shows an enlarged area of FIG. 1 where the second movable wall of the vacuum brake booster is fastened to the connection tube.

DETAILED DESCRIPTION OF THE INVENTION

The tandem brake booster shown in the drawings has a booster housing, which is formed by two shell-shaped housing halves 1 and 2, which are held together on their circumference, for example by lancings. The interior of the booster housing is divided into a rear (brake pedal-side) booster space 24 and a front (main cylinder-side) booster space 25 by a partition 16 sealingly arranged in the booster housing. The rear booster space 24 is divided by a first movable wall 4 into a first vacuum chamber 28 of constant pressure and a first working chamber 29 of variable pressure. The front booster space 25 is divided by a second movable wall 5 into a second vacuum camber 30 and a second working chamber 31. The front housing half 1 is provided with a vacuum connection 46, through which the second vacuum chamber 30 can be connected to a suitable vacuum source, e.g., an intake manifold of the engine of the motor vehicle.

A control valve 6, which can be actuated by an actuating rod 7, is accommodated in a control housing 3 sealingly guided in the rear housing half 2. The control valve 6 consists of a first sealing seat 9 provided at the control housing 3, a second sealing seat 10, which is provided at an axially displaceable valve piston 8 connected to the actuating rod 7, and a disk valve body 11, which cooperates with the two sealing seats 9, 10. The disk valve body 11 is pressed against the sealing seats 9, 10 by a valve spring 48, which is supported at a holding sleeve 47 holding the disk valve body 11 in the control housing 3.

The first movable wall 4 is arranged on the control housing 3 and is formed by a first diaphragm disk 12 deep-drawn from sheet metal and by a flexible first rolling diaphragm 13 lying on the first diaphragm disk 12. The second movable wall 5 consists of a second diaphragm disk 14 and a second rolling diaphragm 15 and is arranged at the end of a preferably metallic connection tube 18 which is a front end or an end extending into the second vacuum chamber 30. The connection tube 18 is in force-transmitting connection with the control housing 3.

The two vacuum chambers 28, 30 are connected to one another through at least one opening 49 provided on the control housing 3 in the area where the connection tube 18 is fastened to the control housing 3. A pneumatic connection is brought about between the two working chambers 29, 31 via channels 50 provided in the area where the partition 16 is fastened to the booster housing or in the area of connection of the two housing halves 1, 2. The initial force of the brake booster is transmitted, via a rubber-elastic reaction disk 21 accommodated in a front-side recess of the control housing 3 and a plunger rod 22 having a head flange 23, to an actuating piston of a main brake cylinder, not shown, of the brake system. Such an actuating piston is arranged at the vacuum-side or front housing half 1 of the vacuum brake booster housing.

A resetting spring 51, which is shown schematically in the drawing and is supported by the vacuum-side housing half 1, holds the movable walls 4 and 5 in the starting position shown. In addition, a piston rod-restoring spring 36, which acts on the holding sleeve 47 and the actuating rod 7, ensures a pretension of the valve piston 8 or its valve seat 10 against the disk valve body 11. The restoring movement of the valve piston 8 is limited by a preferably U-shaped cross member 19, which is pushed laterally into the control housing 3 at right angles to the longitudinal axis of the brake booster according to the present invention, and which in the released position is axially in contact with a ring-shaped area of the rear or brake pedal-side housing half 2, whose cylindrical extension accommodates a sealing ring 20 sealing the control housing 3 against the atmosphere.

As can be determined especially from FIG. 2, the connection tube 18 has, at its end associated with the control housing 3, a radially inwardly extending collar 26, which is in force-transmitting connection with an annular surface (not characterized more specifically) provided at the control housing 3. The radially inner edge area of the first diaphragm disk 12, which is preferably provided with a beading 39, is axially in contact with the collar 26. The first rolling diaphragm 13 cooperating with the first diaphragm disk 12 has a diaphragm portion and an annular bead 32. The diaphragm portion is clamped by the annular bead 32 in an annular groove 52, which is provided in the control housing 3 outside the contact area surrounded by the collar 26 and by the edge area of the first diaphragm disk 12. The diaphragm portion of the first rolling diaphragm 13 is bound to the edge of the bead 32 located away from the first diaphragm disk 12 such that it defines a pneumatic space 27 with the diaphragm disk 12. This guarantees that when the first vacuum chamber 28 has a pneumatic pressure that is higher than the pressure occurring in the first working chamber 29, the first rolling diaphragm 13 can tilt around the connection line at the bead 32, so that no force component that could cause the bead 32 to become detached from the annular groove 52 is generated as a result. At its edge adjacent to the first diaphragm disk 12, the bead 32 has a surface 44, which is axially in contact with the beading 39 and reliably holds the first diaphragm disk 12 and, as a result, also the connection tube 18 at the control housing 3.

FIG. 3 shows the area of fastening of the second movable wall 5 on the connection tube 18. The front end of the connection tube 18, namely the end which is associated with the second movable wall 5, has a radially outwardly extending collar 45 and an annular surface 37 designed coaxially to the axis of the connection tube and extending from the collar 45. The second diaphragm disk 14 is axially supported on the annular surface 37, thereby making possible the transmission of force from the second movable wall 5 to the connection tube 18. A beading 38, which is joined by an annular surface 35 designed coaxially to the annular surface 37 of the connection tube 18, is provided in the radially inner edge area of the second diaphragm disk 14.

The space defined by the cylindrical end area of the connection tube 18, the second collar 45, the annular surface 35, and the beaded edge area of the second diaphragm disk 14 accommodates a radially inner bead 34 of the second rolling diaphragm 15, which is joined by a circumferential sealing lip 43 which is in contact with the connection tube 18. In the section located between the bead 34 and the sealing lip 43, the connection tube 18 has at least one opening 42, which make possible the reduction of an overpressure that may occur in the second vacuum chamber 30. To fix the second diaphragm disk 14 and the radially inner area of the second rolling diaphragm 15 in their positions in relation to the connection tube 18, the annular surface 35 of the second diaphragm disk 14 is provided with at least two bending straps, preferably a radially inwardly extending bending strap 40 and a radially outwardly extending beading strap (not shown). Each bending strap is pushed through a recess 41 provided in the second collar 45 during the mounting of the vacuum brake booster according to the present invention and is transposed radially to the inside or optionally to the outside such that each strap contacts the second collar 45.

Finally, it can be seen in FIG. 3 that the radially inner edge area of the partition 16 also has a circumferential beading 33, which axially fixes a sliding sealing ring 17 arranged therein.

| List of Reference Numbers | |
|---|---|
| 1 | Housing half |
| 2 | Housing half |
| 3 | Control housing |
| 4 | First movable wall |
| 5 | Second movable wall |
| 6 | Control valve |
| 7 | Actuating rod |
| 8 | Valve piston |
| 9 | First sealing seat |
| 10 | Second sealing seat |
| 11 | Valve body |
| 12 | First diaphragm disk |
| 13 | First rolling diaphragm |
| 14 | Second diaphragm disk |
| 15 | Second rolling diaphragm |
| 16 | Partition |
| 17 | Sealing ring |
| 18 | Connection tube |
| 19 | Cross member |
| 20 | Sealing ring |
| 21 | Reaction disk |
| 22 | Plunger rod |
| 23 | Head flange |
| 24 | Rear booster space |
| 25 | Front booster space |
| 26 | Collar |
| 27 | Space |
| 28 | First vacuum chamber |
| 29 | First working chamber |
| 30 | Second vacuum chamber |
| 31 | Second working chamber |
| 32 | Bead |
| 33 | Beading |
| 34 | Bead |
| 35 | Annular surface |
| 36 | Piston rod-restoring spring |
| 37 | Annular surface |
| 38 | Beading |
| 39 | Beading |
| 40 | Bending strap |
| 41 | Recess |
| 42 | Opening |
| 43 | Sealing lip |
| 44 | Surface |
| 45 | Collar |
| 46 | Vacuum connection |
| 47 | Holding sleeve |

-continued

| List of Reference Numbers | |
|---|---|
| 48 | Valve spring |
| 49 | Opening |
| 50 | Channel |
| 51 | Resetting spring |
| 52 | Annular groove |

We claim:

1. Vacuum brake booster for motor vehicles, with a first booster space and a second booster space, which are separated from one another by means of a partition; with a first movable wall which divides the first booster space into a first vacuum chamber and a first working chamber and a second movable wall which divides the second booster space into a second vacuum chamber and a second working chamber, wherein said first movable wall is formed by a first diaphragm disk, having a radially inner edge area, and a first rolling diaphragm, having a bead with an edge located away from said first diaphragm disk, in contact with said first diaphragm disk, and said second movable wall is formed by a second diaphragm disk and a second rolling diaphragm in contact with said second diaphragm disk, wherein the first movable wall is arranged on a control housing, defining an annular groove and accommodating a control valve, and the second movable wall is arranged on a connection tube extending through the partition, and wherein the connection tube is provided with a radial collar supported axially on the control housing, with which collar the radially inner edge area of the first diaphragm disk, which surrounds the control housing, is axially in contact and is held by the first rolling diaphragm, wherein said bead is damped in said annular groove provided in the control housing outside the area of fastening of the connection tube and said first diaphragm disk, characterized in that said first rolling diaphragm is bound to the edge of the said bead located away from said first diaphragm disk and from said collar of said connection tube to define with said first diaphragm disk a pneumatic space, to which the pressure occurring in said first and second vacuum chambers can be admitted.

2. Vacuum brake booster in accordance with claim 1, characterized in that the radially inner edge area of the first diaphragm disk is beaded.

3. Vacuum brake booster in accordance with claim 1, further comprising a sealing ring arranged on said connection tube and characterized in that:

said partition has a radially inner edge area;

the radially inner edge area of said partition is provided with a beading, which secures said sealing ring against axial displacement.

4. Vacuum brake booster in accordance with claim 1, wherein the connection tube has a radially outwardly extending second collar and the second rolling diaphragm has a radially inner bead, which sealingly cooperates with said radially outwardly extending second collar of the connection tube, characterized in that a first, axially extending, cylindrical annular surface, which radially surrounds said bead of said second rolling diaphragm, is provided in the radially inner edge area of said second diaphragm disk.

5. Vacuum brake booster in accordance with claim 4, characterized in that said second collar of said connection tube defines recesses and passes over into a said second, axially extending annular surface, which is in contact with said second diaphragm disk.

6. Vacuum brake booster in accordance with claim 4, wherein said second diaphragm disk defines a beading of smaller diameter and characterized in that said first annular surface joins said beading of smaller diameter, wherein said bead of said second rolling diaphragm is clamped axially between said collar and said beading under pretension.

7. Vacuum brake booster in accordance with claim 5, characterized in that said first annular surface has on its surface at least two said symmetrically designed bending straps, which extend through said recesses provided in said second collar and are in contact with said second collar and with said annular surface in the mounted state.

8. Vacuum brake booster in accordance with claim 1, characterized in that said connection tube has openings in the area of fastening of said second movable wall, and that said second rolling diaphragm is provided with a circumferential sealing lip which is in contact with said connection tube.

9. Vacuum brake booster in accordance with claim 1, characterized in that said bead of said first rolling diaphragm has an annular surface, which is in contact with the radially inner edge area of said first diaphragm disk.

10. A vacuum brake booster for motor vehicles comprising:
   a vacuum brake booster housing and a partition defining a first booster space and a second booster space;
   a control valve;
   a control housing accommodating said control valve and defining an annular groove;
   a connection tube extending through said partition and having a first radial collar supported axially on said control housing;
   a first movable wall, arranged on said control housing and comprising a first diaphragm disk and a first rolling diaphragm in contact with said first diaphragm disk and having a diaphragm portion and a bead, dividing said first booster space into a first vacuum chamber and a first working chamber, wherein:
      (a) said first diaphragm disk has a radially inner edge area which is axially in contact with said first radial collar and which is held by said first rolling diaphragm,
      (b) said bead of said first rolling diaphragm is clamped in said annular groove and has an edge located away from said first diaphragm disk and from said first radial collar, and
      (c) said diaphragm portion of said first rolling diaphragm is bound to said edge of said bead located away from said first diaphragm disk and from said first radial collar to define a pneumatic space with said first diaphragm disk to which pressure occurring in said first vacuum chamber is admitted; and
   a second movable wall, arranged on said connection tube and comprising a second diaphragm disk and a second rolling diaphragm in contact with said second diaphragm disk, dividing said second booster space into a second vacuum chamber and a second working chamber.

11. A vacuum brake booster in accordance with claim 10, wherein said radially inner edge area of said first diaphragm disk has a beading.

12. A vacuum brake booster in accordance with claim 10, wherein said partition has, at a radially inner edge area of said partition, a beading, and said vacuum brake booster further comprises a sealing ring which is secured by said beading of said partition against axial displacement.

13. A vacuum brake booster in accordance with claim 10, wherein:
   said connection tube has a radially outwardly extending second collar;
   said second rolling diaphragm has a radially inner bead which sealingly abuts against said second collar; and
   said second diaphragm disk has, at a radially inner edge area of said second diaphragm disk, a first, axially extending, annular surface which radially surrounds said bead of said second rolling diaphragm.

14. A vacuum brake booster in accordance with claim 13, wherein said connection tube includes a second, axially extending, annular surface which extends from said second collar and is in contact with said second diaphragm disk.

15. A vacuum brake booster in accordance with claim 14, wherein:
   said second diaphragm disk has a beading;
   said first annular surface is connected to said beading of said second diaphragm; and
   said bead of said second rolling diaphragm is clamped axially between said second collar and said beading of said second diaphragm under pretension.

16. A vacuum brake booster in accordance with claim 14, further comprising at least one bending strap extending from said first annular surface and wherein said second collar includes at least one recess through which said at least one bending strap extends to contact said second collar.

17. A vacuum brake booster in accordance with claim 10, wherein:
   said connection tube has at least one opening near an area where said second movable wall is fastened to said connection tube; and
   said second rolling diaphragm has a circumferential sealing lip which is in contact with said connection tube and extends over said at least one opening.

18. A vacuum brake booster in accordance with claim 10, wherein said bead of said first rolling diaphragm has an annular surface which is in contact with said radially inner edge area of said first diaphragm disk.

19. A vacuum brake booster in accordance with claim 10, wherein said annular groove is disposed outside of an area where said connection tube and said first diaphragm disk are fastened to said control housing.

20. A vacuum brake booster for motor vehicles comprising:
   a vacuum brake booster housing defining a booster space;
   a control housing defining an annular groove;
   a connection tube having a radial collar supported axially on said control housing; and
   a movable wall, arranged on said control housing and comprising a diaphragm disk and a rolling diaphragm in contact with said diaphragm disk and having a diaphragm portion and a bead, dividing said booster space into a vacuum chamber and a working chamber, wherein:
      (a) said diaphragm disk has a radially inner edge area which is axially in contact with said radial collar and which is held by said rolling diaphragm,
      (b) said bead of said rolling diaphragm is clamped in said annular groove and has an edge located away from said diaphragm disk and from said radial collar, and
      (c) said diaphragm portion of said rolling diaphragm is bound to said edge of said bead located away from said diaphragm disk and from said radial collar to define a pneumatic space with said diaphragm disk to which pressure occurring in said vacuum chamber is admitted.

* * * * *

UNITED STATES PATENT AND TRADE MARK OFFICE
CERTIFICATE OF CORRECTION

PATENT NO. : 5,680,807
DATED : October 28, 1997
INVENTOR(S) : Wagner

It is certified that error appears in the above-identified patent and that said Letters Patent is hereby corrected as shown below:

At col. 6, line 32, delete "damped" and insert --clamped--.

Signed and Sealed this

Twenty-seventh Day of January, 1998

Attest:

BRUCE LEHMAN

Attesting Officer

Commissioner of Patents and Trademarks